US011468456B2

(12) United States Patent
Balakrishnan et al.

(10) Patent No.: US 11,468,456 B2
(45) Date of Patent: Oct. 11, 2022

(54) METHOD AND SYSTEM FOR GENERATING PURCHASE RECOMMENDATIONS BASED ON PURCHASE CATEGORY ASSOCIATIONS

(71) Applicant: Groupon, Inc., Chicago, IL (US)

(72) Inventors: Raju Balakrishnan, Sunnyvale, CA (US); Vyomkesh Tripathi, Mountain View, CA (US); Rajesh Girish Parekh, San Jose, CA (US); Guoxian Zhang, Fremont, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 17/012,776

(22) Filed: Sep. 4, 2020

(65) Prior Publication Data

US 2021/0056570 A1 Feb. 25, 2021

Related U.S. Application Data

(63) Continuation of application No. 14/818,915, filed on Aug. 5, 2015, now Pat. No. 10,796,321.

(Continued)

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0631* (2013.01)

(58) Field of Classification Search
None
See application file for complete search history.

(56) References Cited

U.S. PATENT DOCUMENTS 6,266,649 B1 7/2001 Linden et al.
8,117,216 B1 * 2/2012 Chanda ............... G06F 16/9038
707/754

(Continued)

FOREIGN PATENT DOCUMENTS

FR 2840088 A1 * 11/2003 ....... G06F 17/30707

OTHER PUBLICATIONS

Winer "Discounting and Its Impacton Durables Buying Decisions" (1997) (https://link.springer.com/content/pdf/10.1023/A:1007945629536.pdf) (Year: 1997).*

*Primary Examiner* — Sujay Koneru
(74) *Attorney, Agent, or Firm* — Alston & Bird LLP

(57) ABSTRACT

Embodiments provide a computer-executable method, computer system and non-transitory computer-readable medium for programmatically generating an association among two or more purchase categories based on purchase data of a plurality of consumers. The method includes programmatically accessing, from a dataset via a network device, prior purchase data associated with purchases of a plurality of commercial objects by a plurality of consumers. The method also includes programmatically identifying a plurality of categories associated with the plurality of commercial objects. The method also includes, for each consumer in the plurality of consumers, programmatically generating a total number of purchases by the consumer in each category in the plurality of categories. The method further includes generating, using a processor of a computing device, a category association score between each pair of categories in the plurality of categories by programmatically analyzing similarities among the total numbers of purchases in the plurality of categories for the plurality of consumers.

17 Claims, 12 Drawing Sheets

Related U.S. Application Data

(60) Provisional application No. 62/033,611, filed on Aug. 5, 2014.

(56) References Cited

U.S. PATENT DOCUMENTS

| | | | | |
|---|---|---|---|---|
| 8,577,705 | B1 | 11/2013 | Baboo et al. | |
| 8,886,799 | B1* | 11/2014 | Zhang | G06Q 30/0241 709/224 |
| 8,996,629 | B1* | 3/2015 | Datar | G06F 16/487 709/206 |
| 9,075,882 | B1 | 7/2015 | Ward et al. | |
| 2005/0171860 | A1 | 8/2005 | Westphal | |
| 2008/0249837 | A1* | 10/2008 | Angell | G06Q 30/0201 705/7.29 |
| 2010/0088323 | A1* | 4/2010 | Ashkenazi | G06F 16/904 707/752 |
| 2010/0191582 | A1* | 7/2010 | Dicker | G06Q 30/0631 705/26.1 |
| 2010/0280881 | A1 | 11/2010 | Faith et al. | |
| 2010/0281029 | A1* | 11/2010 | Parikh | G06Q 30/02 707/769 |
| 2012/0016873 | A1* | 1/2012 | Mathieson | G06F 16/24578 707/723 |
| 2012/0047150 | A1 | 2/2012 | Spiegel | |
| 2012/0170470 | A1 | 7/2012 | Duchenay et al. | |
| 2012/0205433 | A1* | 8/2012 | Dudek | G06Q 20/209 235/375 |
| 2012/0209831 | A1* | 8/2012 | Rehman | G06F 16/248 707/723 |
| 2013/0179246 | A1* | 7/2013 | Ross | G06Q 30/0207 705/14.24 |
| 2013/0218879 | A1 | 8/2013 | Park et al. | |
| 2014/0025418 | A1* | 1/2014 | Huang | G06Q 10/063112 705/7.23 |
| 2014/0032558 | A1 | 1/2014 | Renders et al. | |
| 2014/0172627 | A1* | 6/2014 | Levy | G06Q 30/02 705/26.7 |
| 2014/0188904 | A1* | 7/2014 | Sciuk | G06Q 10/1053 707/749 |
| 2014/0200968 | A1 | 7/2014 | Yoder et al. | |
| 2014/0258016 | A1 | 9/2014 | Hale et al. | |
| 2014/0266860 | A1 | 9/2014 | Blumrosen et al. | |
| 2015/0039388 | A1 | 2/2015 | Rajaraman | |
| 2015/0052002 | A1* | 2/2015 | Welch | G06Q 30/0631 705/26.7 |
| 2015/0106179 | A1* | 4/2015 | Chow | G06Q 30/0215 705/14.17 |
| 2015/0269647 | A1 | 9/2015 | Jagota et al. | |
| 2015/0278836 | A1* | 10/2015 | Liu | G06F 16/35 705/7.33 |
| 2015/0278917 | A1* | 10/2015 | Stoll | G06Q 30/0635 705/26.7 |
| 2015/0332414 | A1* | 11/2015 | Unser | G06F 16/285 705/30 |
| 2015/0356589 | A1* | 12/2015 | Jin | G06Q 30/0224 705/14.25 |
| 2020/0111133 | A1* | 4/2020 | Georgoff | G06Q 30/0273 |

\* cited by examiner

|  | Jewelry 708 | Cosmetics 710 | Pharmaceuticals 712 |
| --- | --- | --- | --- |
| Jewelry 702 | 1 | 0.5 | 0.1 |
| Cosmetics 704 | 0.5 | 1 | 0.2 |
| Pharmaceuticals 706 | 0.1 | 0.2 | 1 |

FIG. 7

METHOD AND SYSTEM FOR GENERATING PURCHASE RECOMMENDATIONS BASED ON PURCHASE CATEGORY ASSOCIATIONS

CROSS-REFERENCE TO RELATED APPLICATIONS

This application is a continuation of U.S. patent application Ser. No. 14/818,915, titled "METHOD AND SYSTEM FOR GENERATING PURCHASE RECOMMENDATIONS BASED ON PURCHASE CATEGORY ASSOCIATIONS" and filed Aug. 5, 2015, which claims the benefit of U.S. Provisional Patent Application No. 62/033,611, filed Aug. 5, 2014, the entire contents of which are hereby incorporated by reference.

TECHNOLOGICAL FIELD

Example embodiments of the present invention relate generally to generating purchase recommendations for consumers.

BACKGROUND

Certain commercial entities maintain websites that generate purchase recommendations for consumers. In this regard, areas for improving conventional techniques for automated and programmatic generation of recommendations have been identified and technical solutions have been implemented in exemplary embodiments.

BRIEF SUMMARY

Embodiments provide a computer-executable method, computer system and non-transitory computer-readable medium for programmatically generating an association among two or more purchase categories based on purchase data of a plurality of consumers.

In accordance with one exemplary embodiment, a computer-executed method is provided for programmatically generating an association among two or more purchase categories based on purchase data of a plurality of consumers. The method includes programmatically accessing, from a dataset via a network device, prior purchase data associated with purchases of a plurality of commercial objects by a plurality of consumers. The method also includes programmatically identifying a plurality of categories associated with the plurality of commercial objects. The method also includes, for each consumer in the plurality of consumers, programmatically generating a total number of purchases by the consumer in each category in the plurality of categories. The method further includes generating, using a processor of a computing device, a category association score between each pair of categories in the plurality of categories by programmatically analyzing similarities among the total numbers of purchases in the plurality of categories for the plurality of consumers. The method further includes storing, on a non-transitory computer-readable storage device, the category association scores associated with the pairs of categories.

In accordance with another exemplary embodiment, a computer-executed method is provided for recommending promotions offered by a promotion and marketing service. The method includes programmatically receiving a first promotion for recommendation to a consumer, and programmatically determining a first promotion category associated with the first promotion. The method also includes programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The method also includes, based on the first pairwise promotion association score, determining a second promotion associated with the second promotion category for recommendation to the consumer. The method further includes transmitting computer-executable instructions to a computing device associated with the consumer, the computer-executable instructions configured to cause a visual display device associated with the computing device to display a first impression for the first promotion and a second impression for the second promotion.

In accordance with another exemplary embodiment, a computer-executed method is provided for recommending promotions offered by a promotion and marketing service. The method includes programmatically receiving a first promotion category associated with prior purchase data of a first consumer. The method also includes programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The method also includes, based on the first pairwise promotion association score, determining a promotion associated with the second promotion category for recommendation to the consumer. The method further includes transmitting computer-executable instructions to a computing device associated with the consumer, the computer-executable instructions configured to cause a visual display device associated with the computing device to display an impression for the promotion associated with the second promotion category.

In accordance with another exemplary embodiment, a non-transitory computer-readable medium is provided, the non-transitory computer-readable medium having encoded thereon one or more computer-executable instructions that, when executed on a computer processor, cause execution of a computer-executable method for programmatically generating an association among two or more purchase categories based on purchase data of a plurality of consumers. The method includes programmatically accessing, from a dataset via a network device, prior purchase data associated with purchases of a plurality of commercial objects by a plurality of consumers. The method also includes programmatically identifying a plurality of categories associated with the plurality of commercial objects. The method also includes, for each consumer in the plurality of consumers, programmatically generating a total number of purchases by the consumer in each category in the plurality of categories. The method further includes generating, using a processor of a computing device, a category association score between each pair of categories in the plurality of categories by programmatically analyzing similarities among the total numbers of purchases in the plurality of categories for the plurality of consumers. The method further includes storing, on a non-transitory computer-readable storage device, the category association scores associated with the pairs of categories.

In accordance with another exemplary embodiment, one or more non-transitory computer-readable media are provided having encoded thereon one or more computer-executable instructions that, when executed on a computer, cause performance of a computer-executed method for recommending promotions offered by a promotion and marketing service. The method includes programmatically receiving a first promotion for recommendation to a consumer, and programmatically determining a first promotion category associated with the first promotion. The method also includes programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The method also includes, based on the first pairwise promotion association score, determining a second promotion associated with the second promotion category for recommendation to the consumer. The method further includes transmitting computer-executable instructions to a computing device associated with the consumer, the computer-executable instructions configured to cause a visual display device associated with the computing device to display a first impression for the first promotion and a second impression for the second promotion.

In accordance with another exemplary embodiment, one or more non-transitory computer-readable media are provided having encoded thereon one or more computer-executable instructions that, when executed on a computer, cause performance of a computer-executed method for recommending promotions offered by a promotion and marketing service. The method includes programmatically receiving a first promotion category associated with prior purchase data of a first consumer. The method also includes programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The method also includes, based on the first pairwise promotion association score, determining a promotion associated with the second promotion category for recommendation to the consumer. The method also includes transmitting computer-executable instructions to a computing device associated with the consumer, the computer-executable instructions configured to cause a visual display device associated with the computing device to display an impression for the promotion associated with the second promotion category.

In accordance with another exemplary embodiment, a computer system is provided. The computer system includes a network device. The computer system also includes a processor programmed or configured to programmatically access, from a dataset via the network device, prior purchase data associated with purchases of a plurality of commercial objects by a plurality of consumers. The processor is also programmed or configured to execute a purchase category generation engine programmed or configured to programmatically identify a plurality of categories associated with the plurality of commercial objects. The processor is further programmed or configured to execute a category association generation engine that is programmed or configured to, for each consumer in the plurality of consumers, generate a total number of purchases by the consumer in each category in the plurality of categories. The category association generation engine is also programmed or configured to generate a category association score between each pair of categories in the plurality of categories by programmatically analyzing similarities among the total numbers of purchases in the plurality of categories for the plurality of consumers. The computer system further includes a non-transitory computer-readable storage device for storing the category association scores associated with the pairs of categories.

In accordance with another exemplary embodiment, a computer system is provided. The computer system includes a network device. The computer system also includes a processor programmed or configured to programmatically access, from a purchase category dataset, information on a first promotion for recommendation to a consumer and a first promotion category associated with the first promotion. The processor is also programmed or configured to programmatically access, from a category association dataset, a first pairwise promotion association score associated with the first promotion category and a second promotion category. The first pairwise promotion association score indicates a probability that a consumer purchasing a promotion in the first promotion category will also purchase a promotion in the second promotion category. The processor is also programmed or configured to determine, based on the first pairwise promotion association score, a second promotion associated with the second promotion category for recommendation to the consumer. The processor is further programmed or configured to transmit, via the network device, computer-executable instructions to a computing device associated with the consumer, the computer-executable instructions configured to cause a visual display device associated with the computing device to display a first impression for the first promotion and a second impression for the second promotion.

In accordance with another exemplary embodiment, a computer system is provided. The computer system includes a network device. The computer system also includes a processor programmed or configured to programmatically receive a first promotion category associated with prior purchase data of a first consumer. The processor is also programmed or configured to programmatically access a first pairwise promotion association score associated with the first promotion category and a second promotion category. The first pairwise promotion association score indicates a probability that a consumer purchasing a promotion in the first promotion category will also purchase a promotion in the second promotion category. The processor is also programmed or configured to determine, based on the first pairwise promotion association score, a promotion associated with the second promotion category for recommendation to the consumer. The processor is further programmed or configured to transmit, via the network device, computer-executable instructions to a computing device associated with the consumer, the computer-executable instructions configured to cause a visual display device associated with the computing device to display an impression for the promotion associated with the second promotion category.

In accordance with another exemplary embodiment, a computer system is provided. The computer system includes means for programmatically accessing prior purchase data associated with purchases of a plurality of commercial objects by a plurality of consumers, means for programmatically identifying a plurality of categories associated with the plurality of commercial objects, and means for programmatically generating, for each consumer in the plurality of consumers, a total number of purchases by the consumer in each category in the plurality of categories. The computer system also includes means for generating a category association score between each pair of categories in the plurality of categories by programmatically analyzing similarities among the total numbers of purchases in the plurality of categories for the plurality of consumers. The computer system further includes means for storing the category association scores associated with the pairs of categories.

In accordance with another exemplary embodiment, a computer system is provided. The computer system includes means for programmatically receiving a first promotion for recommendation to a consumer, and means for programmatically determining a first promotion category associated with the first promotion. The computer system also includes means for programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The computer system also includes means for determining, based on the first pairwise promotion association score, a second promotion associated with the second promotion category for recommendation to the consumer. The computer system further includes means for transmitting computer-executable instructions to a computing device associated with the consumer, the computer-executable instructions configured to cause a visual display device associated with the computing device to display a first impression for the first promotion and a second impression for the second promotion.

In accordance with another exemplary embodiment, a computer system is provided. The computer system includes means for programmatically receiving a first promotion category associated with prior purchase data of a first consumer. The computer system also includes means for programmatically accessing a first pairwise promotion association score associated with the first promotion category and a second promotion category, the first pairwise promotion association score indicating a probability that a consumer purchasing a promotion in the first promotion category will also purchase a promotion in the second promotion category. The computer system also includes means for determining, based on the first pairwise promotion association score, a promotion associated with the second promotion category for recommendation to the consumer. The computer system further includes means for transmitting computer-executable instructions to a computing device associated with the consumer, the computer-executable instructions configured to cause a visual display device associated with the computing device to display an impression for the promotion associated with the second promotion category.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

FIG. 7 is a schematic illustration of a portion of a category association dataset.

Figure 1:
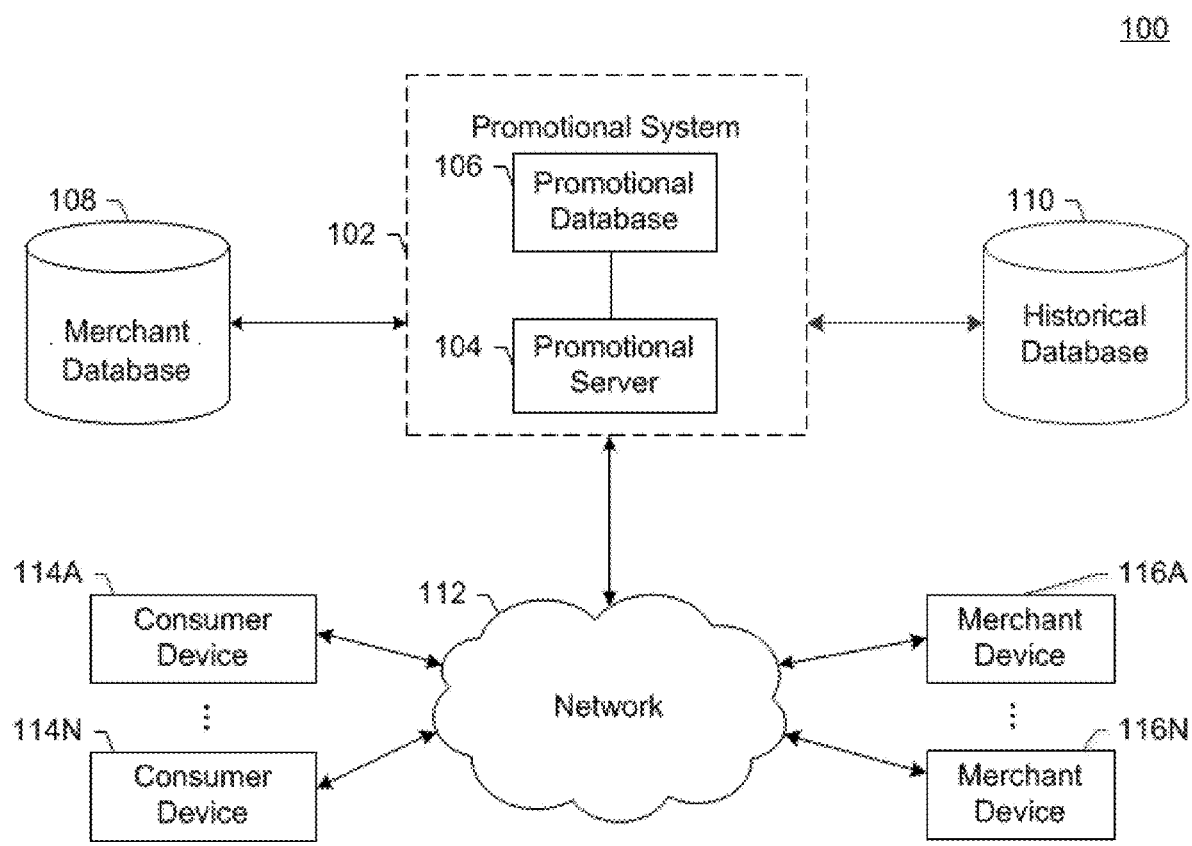
FIG. 1 is a block diagram illustrating an exemplary system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for programmatically associating different categories and/or sub-categories of commercial objects (e.g., promotions, goods, products, services) in order to recommend commercial objects for purchase in a targeted manner and/or to rank or order a display of commercial objects for purchase.

Certain physical commercial stores (e.g., retail stores) encourage and increase purchases by placing related items in proximity to one another. For example, in a jewelry store, gold earrings may be placed next to gold necklaces as consumers typically tend to purchase these items together. Certain physical commercial stores (e.g., grocery stores) place items likely to be purchased together by consumers on a route likely to be taken by consumers within the stores. For example, milk and eggs may be placed along the same edge of a grocery store so that they consumers encounter them on a typical route through the store. Such organizations of items in physical stores thereby encourage additional purchases and increase revenue for the stores. There are challenges to encourage purchases in a similar manner in the realm of online shopping, and especially in the sale of promotions offered by a promotion and marketing service. To address these challenges, certain exemplary embodiments provide purchase recommendations for multiple commercial objects in the same field of view, for example, in the same user interface displayed on a visual display device. In certain embodiments, purchase recommendations for commercial objects in multiple categories or sub-categories may be displayed in the same field of view.

Different types of consumers typically have different purchase patterns, with consumers who typically make purchases in one category also making purchases in another category. For example, it may be determined in exemplary embodiments that consumers who make purchases in the category "Women's fashion accessories" also tend to make purchases in the category "Women's jewelry." Exemplary embodiments may programmatically analyze large volumes of prior purchase data (for example, for purchases of promotions offered by a promotion and marketing service), and generate pairwise category association scores for each pair of categories in which the purchases were made. The category association score for a pair of a first category and a second category may indicate a numeric probability or likelihood that consumers who make purchases in the first category will also make purchases in the second category, and vice versa. The category association scores may be used by exemplary embodiments in making targeted purchase recommendations to consumers.

As one example, if it is determined that a consumer is to be recommended or notified of a commercial object in a first category (e.g., based on a search performed by the consumer in the first category), then exemplary embodiments may determine that it is likely that the consumer will also make a purchase in a second category. This may be determined based on a category association score between the first and second categories being higher than a predetermined threshold. As such, exemplary embodiments may also recommend a commercial object in the second category to the consumer to capitalize on the likelihood that the consumer may purchase commercial objects in both of the first and second categories.

In an exemplary embodiment, a search request including an indication of a first category may be received from a first consumer. A first category association score between the first category and a second category may be accessed. Based on the first category association score, the second category may be selected for recommendation to the first consumer, and a second commercial object associated with the second category may be selected. One or more computer-executable instructions may be transmitted to a computing device of the first consumer to cause the consumer computing device to visually display an indication of the second commercial object. An indication of the second commercial object may be displayed on the consumer computing device on a webpage, in an email, using a mobile notification, and the like.

As another example, a particular consumer's prior purchase data may be used along with the category association scores to recommend commercial objects to the consumer. The consumer's prior purchases may have been in a first set of categories. Exemplary embodiments may determine that the first set of categories is related to a second set of categories by category association scores that are above a predetermined threshold. In this case, exemplary embodiments may recommend one or more commercial objects in the second set of categories to the consumer to capitalize on the likelihood that the consumer may purchase commercial objects in the second set of categories.

In certain embodiments, a particular consumer's profile data may be used along with the category association scores to recommend commercial objects to the consumer. The consumer's profile data may indicate that the consumer is interested in a first set of categories. Exemplary embodiments may determine that the first set of categories is related to a second set of categories by category association scores that are above a predetermined threshold. In this case, exemplary embodiments may recommend one or more commercial objects in the second set of categories to the consumer to capitalize on the likelihood that the consumer may purchase commercial objects in the second set of categories.

In an exemplary embodiment, an indication of a first category associated with a first commercial object previously purchased by a first consumer may be received. A first category association score between the first category and a second category may be programmatically accessed. Based on the first category association score, the second category may be selected for recommendation to the first consumer, and a second commercial object associated with the second category may be selected. One or more computer-executable instructions may be transmitted to a computing device of the first consumer to cause the consumer computing device to visually display an indication of the second commercial object. An indication of the second commercial object may be displayed on the consumer computing device on a webpage, in an email, using a mobile notification, and/or the like.

Exemplary embodiments may use the generated category association scores to rank or order a display of a first commercial object in a first category within a list of multiple commercial objects, for example, by analyzing category association scores for the first category in relation to the categories in which a consumer previously made purchases. In this case, the higher the category association scores for the first category, the higher the first commercial object may be ranked in the list.

Thus, exemplary embodiments generate category association scores that are based on a large amount of prior purchase data and are therefore predictive of purchase trends among different categories of purchases. Use of the category association scores thus leads to more accurate predictions of future purchases, and allows purchase recommendations that are likely to result in actual purchases. In addition, in making purchase recommendations for a particular consumer, certain embodiments may consider the purchase history of that particular consumer along with the category association scores. This results in customized and personalized purchase recommendations that increase the likelihood that the purchase recommendations will result in purchases by that particular consumer. In this respect, embodiments provide dynamic and customized purchase recommendations that provide technical advantages over conventional recommendation systems that that do not account for a particular consumer's prior purchase history in making purchase recommendations.

An exemplary embodiment may be used to recommend commercial objects that are promotions offered by a promotion and marketing service. The categories may be categories associated with the subject matter of the products, services or experiences provided by the promotions. For example, a promotion for a discounted gold necklace may have an associated category of "Jewelry" and sub-categories of "Jewelry—Necklace" and "Jewelry—Gold." The ability to recommend promotions for purchase that are of particular relevance to each consumer is important in a promotion and marketing service as it helps maintain an active and engaged customer base and maximize profits for the promotion and marketing service. Impressions provided to a consumer, especially on a mobile computing device, can be intrusive. As such, it is critical to provide impressions of relevant promotions and to implicitly empower consumers to control the impressions that they receive.

In certain cases, an exemplary purchase category may indicate a subject matter or a functional classification of a commercial object, e.g., jewelry, pharmaceuticals, toiletries, cosmetics, home improvement, and the like. An exemplary sub-category may provide more granular indications of a subject matter or a functional classification of a commercial object, e.g., jewelry—men, pharmaceuticals—skin, home improvement—kitchen. Even more granular sub-categories may also be provided.

In certain cases, a category or sub-category may broadly indicate a classification of any feature of a commercial object. Exemplary categories or sub-categories may describe, for example, a subject matter associated with the commercial object (e.g., category "outdoorsy" may describe an outdoor equipment), a genre of a product (e.g., category "Italian food" or "sushi" may describe a type of food sold), a feature or component of a commercial object (e.g., category "spicy" may describe food that is spicy, categories "vegetarian," "fatty" and "gluten-free"), and the like.

In certain cases, a category or sub-category may indicate a contextual description describing a contextual feature or attribute of a commercial object. Exemplary contextual categories may describe, for example, a setting (e.g., category "romantic" may describe a restaurant as having a romantic setting), and the like.

In certain cases, a category or sub-category may indicate a quality associated with a commercial entity or object. Exemplary quality attribute descriptors may describe, for example, durability (e.g., category "rugged" may describe a durable pair of hiking boots), fragility (e.g., category "brittle"), and the like.

Each commercial object may be associated with one or more categories and/or one or more sub-categories.

I. Definitions of Terms

Certain terms used in connection with exemplary embodiments are defined below.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "merchant" may include, but is not limited to, a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "commercial entity" may include any commercial actor including, but not limited to, an individual, a consumer, a buyer, a seller, a group of individuals, a company, a retailer, a wholesaler, a service provider, a promotion and marketing service, and the like.

As used herein, the term "commercial object" may include any item (e.g., good, product, service, experience or promotion) that may be purchased or sold.

As used herein, the term "consumer interface" may include any digitally rendered user interface displayed on a visual display device for enabling a consumer to interface with a promotion and marketing service. An exemplary consumer interface may enable a consumer to view one or more promotions, purchase one or more promotions, share one or more promotions with other consumers, receive messages and/or promotions from other consumers, receive messages from the promotion and marketing service, and the like. Exemplary consumer interfaces may be rendered in any desired form including, but not limited to, as a mobile application for display on a mobile computing device (e.g., a smartphone), a webpage or website for display on a mobile or non-mobile computing device via the Internet, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "promotion score" refers to a programmatically generated quantitative or qualitative score or indication of the expected effectiveness of providing an impression of a promotion to a consumer. In some embodiments, the expected effectiveness may be indicated by a predicted probability or likelihood that the consumer will purchase the promotion offered by an impression.

As used herein, the terms "purchase category," "purchase sub-category," "category" and "sub-category" refer to any suitable categorization, sub-categorization, classification, and the like, of a commercial object that is or may be purchased. An exemplary purchase category may indicate a subject matter or a functional classification of a commercial object, e.g., jewelry, pharmaceuticals, toiletries, cosmetics, home improvement, and the like. An exemplary sub-category may provide more granular indications of a subject matter or a functional classification of a commercial object, e.g., jewelry—men, pharmaceuticals—skin, home improvement—kitchen. Even more granular sub-categories may also be provided. Although exemplary embodiments are described in connection with categories, a combination of categories and sub-categories may be used, and sub-categories may be used in place of categories.

As used herein, the term "category association score" refers to a pairwise score associated with two purchase categories and indicating a probability or likelihood that a consumer making a purchase in one purchase category will also make a purchase in the other purchase category.

As used herein, the term "impression" may include a communication, a display, or other perceived indication, such as a flyer, print media, e-mail, text message, application alert, mobile applications, mobile notifications, other type of electronic interface or distribution channel and/or the like, of one or more promotions. For example, and using the aforementioned running company as the example provider, an e-mail communication sent to consumers that indicates the availability of a promotion of $25 for $50 toward running shoes.

As used herein, the term "voucher" may include, but is not limited to, any type of gift card, tender, electronic certificate, medium of exchange, or the like, that embodies the terms of the promotion from which it results and which may be used toward at least a portion of the purchase, acquisition, procurement, consumption, or the like, of goods, services and/or experiences. In some examples, a voucher may take the form of tender that has a given value that is exchangeable for goods, services and/or experiences and/or a reduction in a purchase price of a particular good, service or experience. In some examples, the voucher may have multiple values, such as an accepted value, a promotional value and/or a residual value. For example, using the aforementioned running company as the example provider, a voucher may comprise an electronic indication in a mobile application that shows $50 of value to spend at the running company. In some examples, the accepted value of the voucher is defined by the value exchanged for the voucher. In some examples, the promotional value of the voucher is defined by the promotion from which the voucher resulted and is the value of the voucher beyond the accepted value. In some examples, the residual value of the voucher is the value after redemption, the value after the expiry or other violation of a redemption parameter, the return or exchange value of the voucher, or the like.

As used herein, the term "redemption" may include the use, exchange or other presentation of a voucher for at least a portion of a good, service or experience as defined by the voucher and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the terms "mobile computing device" and "mobile device" refer to any computing or communication device that is portable and is transported in normal usage (e.g., the iPhone™ mobile communication device, the Android™ mobile communication device, and the like), and that is capable of communication and that has sufficient processor power and memory capacity to perform the operations described herein. For example, and without limitation, a mobile computing device may include a smartphone, a table computer, a laptop computer, and the like.

As used herein, the terms "application program," "mobile application" and "mobile app" refer to computer-executable application software programmed or configured to run on a processing unit of a mobile computing device.

As used herein, the term "promotion application program" refers to an application program programmed or configured to run on a processing unit of a mobile computing device in order to enable a user of the computing device to use a promotion and marketing service. An exemplary promotion application program may be in constant or periodic communication with a remote computing device or server run by the promotion and marketing service to provide computer-executable functionality to the mobile computing device. An exemplary promotion application program may, for example, provide a user interface configured to render impressions of one or more promotions, receive user input selecting one or more impressions, and enable purchase of the promotions in response to user input.

As used herein, the term "module," encompasses hardware, software and/or firmware configured to perform one or more particular functions.

As used herein, the term "computer-readable medium" refers to a non-transitory storage hardware, non-transitory storage device or non-transitory computer system memory that may be accessed by a controller, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

As used herein, the term "set" refers to a collection of one or more items.

As used herein, the term "plurality" refers to two or more items.

As used herein, the terms "equal" and "substantially equal" refer interchangeably, in a broad lay sense, to exact equality or approximate equality within some tolerance.

As used herein, the terms "similar" and "substantially similar" refer interchangeably, in a broad lay sense, to exact sameness or approximate similarity within some tolerance.

As used herein, the terms "couple," "coupled" and "coupling" refer to a direct or indirect connection among two or more components. For example, a first component may be coupled to a second component directly or through one or more intermediate components.

II. Exemplary Embodiments

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Although certain embodiments are described herein with reference to promotions and a promotion and marketing service, certain other embodiments are not thusly limited and may be implemented generally and without specific reference to promotions to a promotion and marketing service.

FIG. 1 is a block diagram illustrating an exemplary system within which exemplary embodiments may operate. An exemplary promotion and marketing service 100 may manage a promotional system 102 for managing the offer, purchase, and redemption of a set of promotions. Consumers and merchants may access the promotional system 102 via a network 112 (such as the Internet, or the like) using computer devices 114A through 114N and 116A through 116N, respectively. The promotional system 102 may include a promotional server 104 in communication with a promotional database 106 that stores the set of promotions managed by the promotion and marketing service. The promotion system 102 may have access to a merchant database or any suitable data storage structure 108 storing information on one or more merchants, one or more products offered by a merchant, one or more services offered by a merchant, and the like. The promotional system 102 may have access to a historical database or any suitable data storage structure 110 storing information regarding one or more of: promotions and impressions previously distributed to consumers, consumer profile data, prior activities performed by consumers with respect to promotions and impressions, prior activities performed by consumers with respect to commercial entities or objects, and the like. In various embodiments, promotional database 106, merchant database 108 and historical database 110 may be distinct databases, or may alternatively refer to a single database. In certain embodiments, merchant database 108 and historical database 110 may be provided independently of a promotional system 102.

Figure 2:
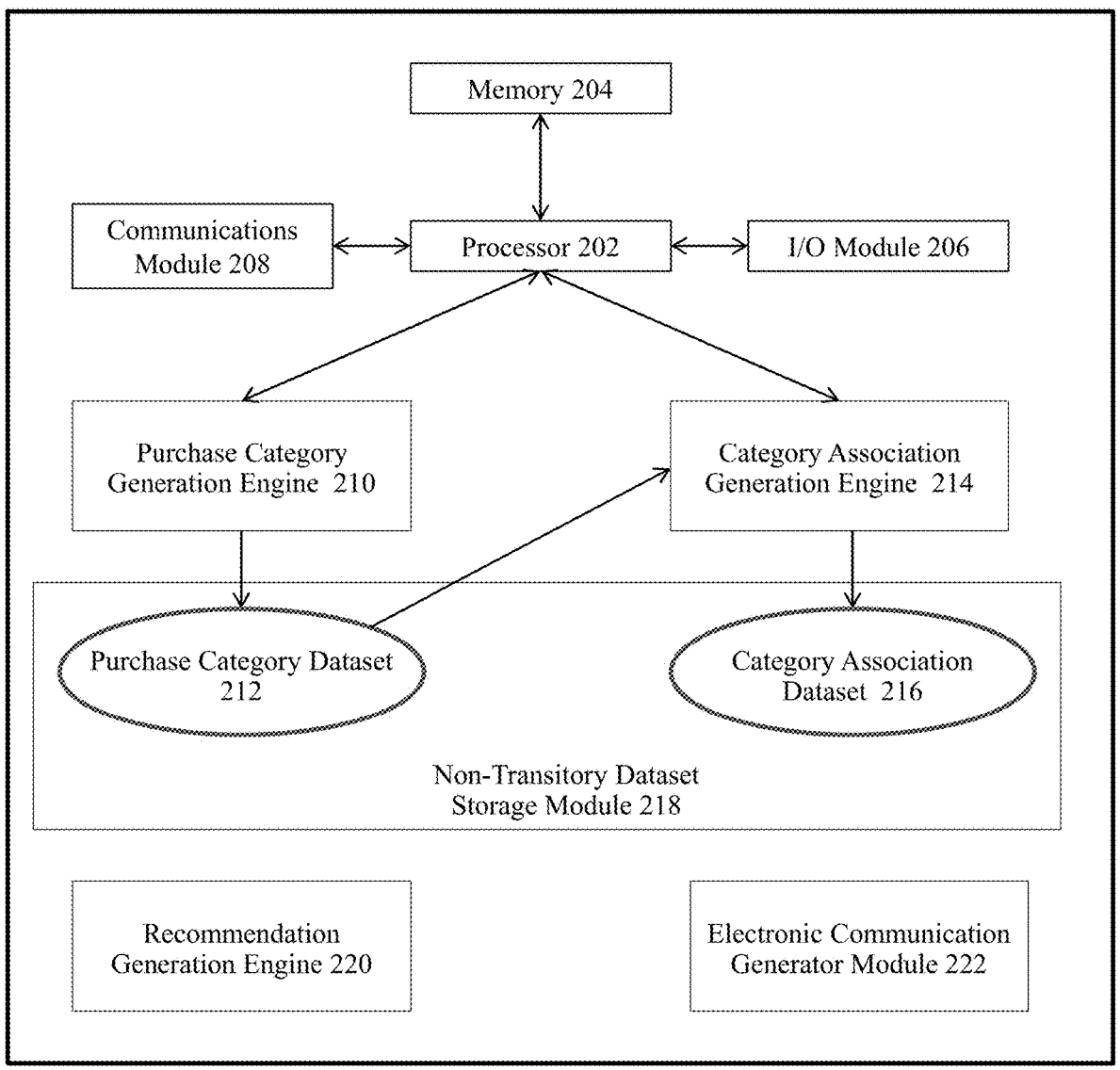
FIG. 2 is a block diagram illustrating exemplary modules of a computing device for use in a promotional server in accordance with certain exemplary embodiments.

The promotional server 104 may be embodied by a computing system, such as apparatus 200 shown in FIG. 2. As illustrated in FIG. 2, the apparatus 200 may include a computer processor or computer processing module 202, a memory 204, an input/output module 206, and a communications module 208.

In some embodiments, the apparatus 200 may include a purchase category generation engine 210 programmed or configured to programmatically and automatically process prior purchase histories for a plurality of consumers and generate categories associated with the purchases. The purchase category generation engine 210 may receive as input data on prior purchases associated with a plurality of consumers, for example, a list of commercial objects (e.g., products, goods, services, experiences, promotions) purchased by each consumer, a list of purchase categories in which each consumer made purchases, and the like. In one example, data may flow to the purchase category generation engine 210 via a network device from a dataset stored on the historical database 110. The purchase category generation engine 210 may generate as output a purchase category dataset 212 based on the input data, the dataset 212 storing an indication of categories represented in the prior purchase data. The purchase category dataset 212 may be any suitable data structure (e.g., relational database, array) stored on a non-transitory computer-readable medium (e.g., memory 204 or any suitable storage device included in or in communication with the apparatus 200). That is, data may flow from the purchase category generation engine 210 to the purchase category dataset 212.

In one embodiment, the purchase category dataset 212 may store data represented as a two-dimensional purchase category matrix in which rows correspond to different consumers and columns correspond to different categories represented in the prior purchase data. In the matrix, each entry $e_{ij}$ corresponds to the i-th row and the j-th column, and indicates the number of purchases of the j-th category by the i-th consumer. The entry is zero, for example, if the i-th consumer has not purchased in the j-th category; the entry is one, for example, if the i-th consumer has purchased in the j-th category only once. In another embodiment of the two-dimensional purchase category matrix, columns may correspond to different consumers and rows may correspond to different categories represented in the prior purchase data.

In some embodiments, the apparatus 200 may include a category association generation engine 214 programmed or configured to programmatically and automatically process purchase category data in the purchase category dataset 212 and generate category association scores. In one exemplary embodiment, each category association score may be a pairwise score associated with two purchase categories and indicating a likelihood or probability that a consumer purchasing in one purchase category will also purchase in the other purchase category. In one embodiment, category association scores may be generated for each pair of categories in the purchase category dataset 212. The category association generation engine 214 may receive as input data from the purchase category dataset 212. That is, data may flow from the purchase category dataset 212 to the category association generation engine 214. The category association generation engine 214 may generate as output a category association dataset 216 based on the input data, the category association dataset 216 storing the generated pairwise category association scores. That is, data may flow from the category association generation engine 214 to the category association dataset 216.

The category association dataset 216 may be any suitable data structure (e.g., relational database, array) stored on a non-transitory computer-readable medium (e.g., memory 204 or any suitable storage device included in or in communication with the apparatus 200). In one embodiment, the dataset 216 may store data represented as a two-dimensional category association matrix in which rows and columns correspond to different categories represented in the prior purchase data. In the matrix, each entry $e_{ij}$ corresponds to the i-th row and the j-th column, and indicates a likelihood that a consumer purchasing in the j-th category will also purchase in the i-th category. In one exemplary embodiment, the likelihood may range from zero to one, with increasing fractions indicating higher likelihoods.

The processor 202 may be programmed or configured to display, on a visual display device, information retrieved from the purchase category dataset 212 and/or the category association dataset 216.

The system 200 may include a non-transitory dataset storage module 218 for storing the purchase category dataset 212 and/or the category association dataset 214.

The system 200 may also include a recommendation generation engine 220 that is programmed or configured to recommend commercial objects for purchase for a particular consumer based on one or more of the following factors: prior purchase data for the consumer, profile data of the consumer, an identification of the consumer, search terms entered by the consumer, and the like. In one embodiment, the recommendation generation engine 220 may retrieve and use category association scores in making purchase recommendations. Details of the programming or configuration of the recommendation generation engine 220 are described herein in connection with FIGS. 8A, 8B and 9.

The system 200 may also include an electronic communication generator module 222 programmed or configured to receive and transmit electronic communications and data, via a network device, to and from external device. In one embodiment, the electronic communication generator module 222 may transmit computer-executable instructions to a consumer's computing device that cause display of a representation of one or more commercial objects recommended by the recommendation generation engine 220.

In some embodiments, the processor 202 (and/or co-processor or any other processing circuitry assisting or otherwise associated with the processor) may be in communication with the memory 204 via a bus for transmitting information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In one embodiment, a consumer or merchant may use the apparatus 200 (e.g., as a kiosk) to communicate with the promotional system 102 to view promotion information or interact with promotions. However, in some embodiments of the present invention, the consumer or merchant may perform these functions from outside of the promotional system 102 using, for example, an end-user device, such as consumer device 114 or merchant device 116.

Figure 3:
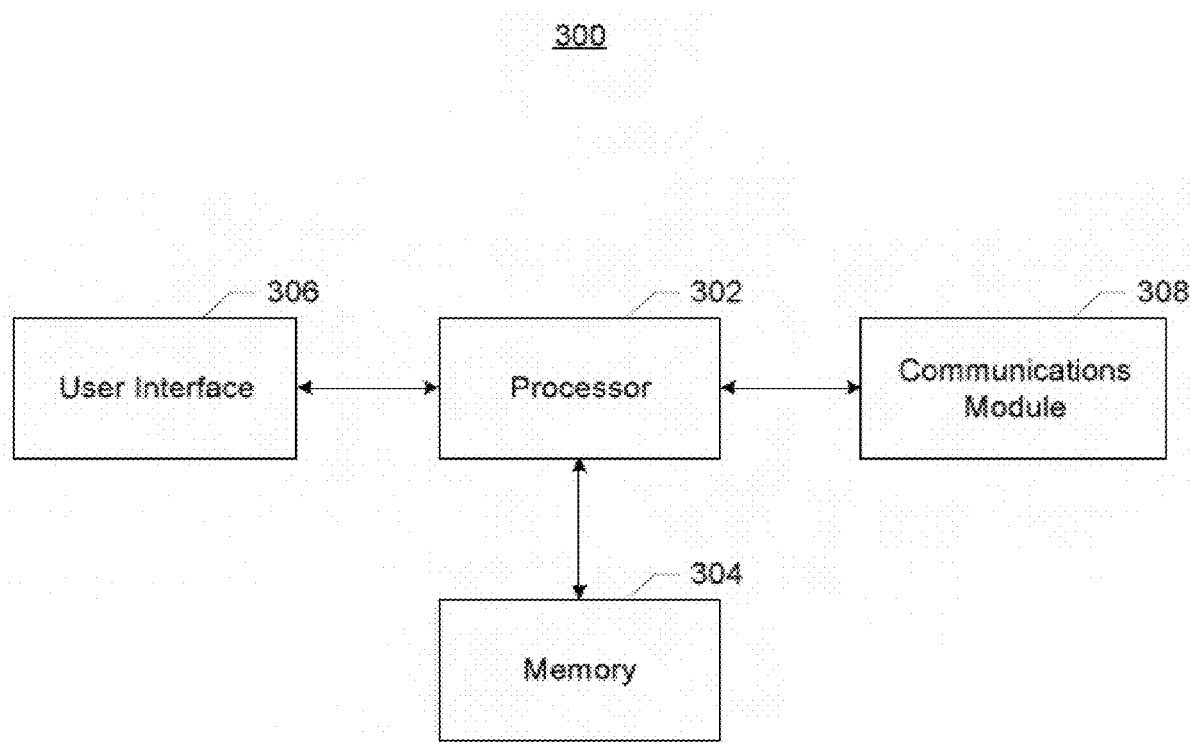
FIG. 3 is a block diagram illustrating exemplary modules of a computing device for use by a consumer or merchant in accordance with an exemplary embodiment.

Referring now to FIG. 3, a block diagram is illustrated showing an example end-user device, apparatus 300, that may be configured to enable a user to view promotions from outside the promotional system 102, in accordance with embodiments of the present invention. In FIG. 3, the apparatus 300, which may embody consumer device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface 306 may include a display and may comprise a web user interface, a mobile application, a client device, a kiosk, or the like. In some embodiments, the user interface 306 may also include a keyboard, a mouse, a touch screen, touch areas, soft keys, a microphone, a speaker, or other input/output mechanisms. The processor 302, or user interface circuitry comprising the processor 302, may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300 (e.g., promotional server 104 or, more generally, promotional system 102, other consumer devices 114 or merchant devices 116, or the like). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Figure 4:
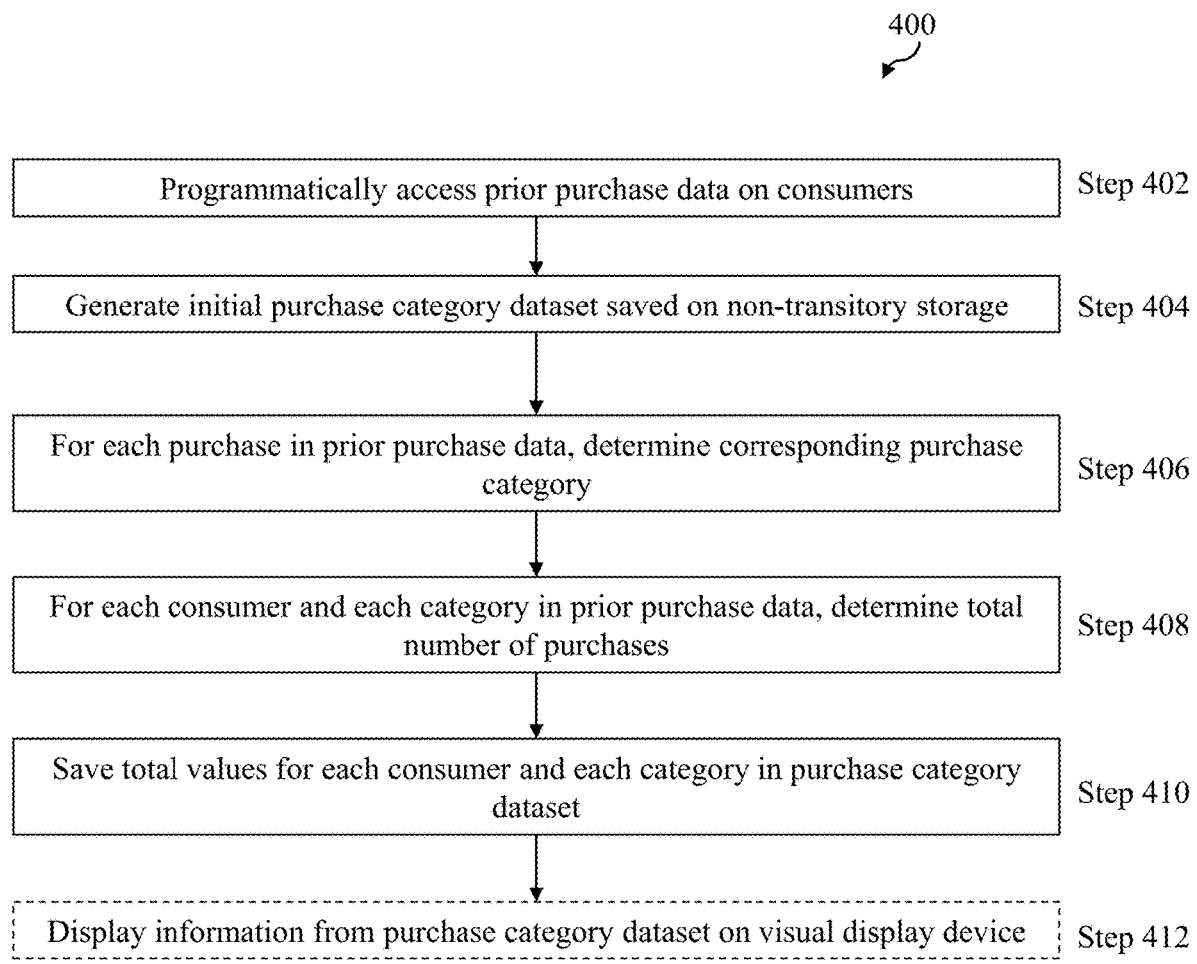
FIG. 4 is a flowchart illustrating an exemplary computer-executable method for programmatically processing prior purchase data to generate a purchase category dataset.

FIG. 4 is a flowchart illustrating an exemplary computer-executed method 400 for using the purchase category generation engine 210 to programmatically and automatically generate a purchase category dataset 212.

In step 402, prior purchase data on a plurality of consumers may be programmatically accessed, for example, from the historical database 110 via a network device. The prior purchase data may include information on different consumers and their prior purchases of commercial objects (e.g., products, services, promotions). Exemplary information may include, but is not limited to, identifications of the commercial objects purchased, categories associated with the purchases, time periods within which the purchases were made, merchants associated with the commercial objects, identifications of the consumers, and the like.

In step 404, a purchase category dataset 212 may be generated for storing data on the categories in which purchases were made by the consumers. The purchase category dataset 212 may be configured as any suitable data structure, for example, a two-dimensional matrix. In the matrix, each entry $e_{ij}$ corresponds to the i-th row and the j-th column, and indicates the number of purchases of the j-th category by the i-th consumer. The entry is zero, for example, if the i-th consumer has not purchased in the j-th category; the entry is one, for example, if the i-th consumer has purchased in the j-th category only once. The purchase category dataset 212 may be saved on a non-transitory computer-readable storage medium or device. In certain non-limiting embodiments, the purchase category dataset 212 may also include other information, such as, but not limited to, identifications of the commercial objects purchased, time periods within which the purchases were made, merchants associated with the commercial objects, identifications of the consumers, and the like.

In step 406, for each purchase indicated in the prior purchase data accessed in step 402, the corresponding purchase category may be determined or accessed from the prior purchase data. In one embodiment, the categories may be indicated in the prior purchase data accessed in step 402, and may simply be retrieved. In another embodiment, the categories may be determined from an analysis of one or more factors including, but not limited to, identification of a commercial object purchased, an associated merchant, a price range, a subject matter of the commercial object, and the like. In some cases, different commercial objects may be associated with or mapped to predetermined categories and sub-categories, and these associations may be used to determine the category of a particular commercial object. For example, any non-medicated lotions may be mapped to a predetermined category of "cosmetics—skin," while any medicated lotions may be mapped to a predetermined category of "pharmaceutical—skin."

In step 408, for each consumer in the prior purchase data accessed in step 402, the number of purchases made by that consumer in each category may be summed to generate a total number of purchases for that consumer for that category.

In step 410, the total values may be saved in the purchase category dataset 212 for each consumer for each category.

In certain non-limiting embodiments, in step 412, information from the purchase category dataset 212 may be displayed on a visual display device, for example, in response to a request transmitted from an external computing device and received via a network device.

Figure 5:
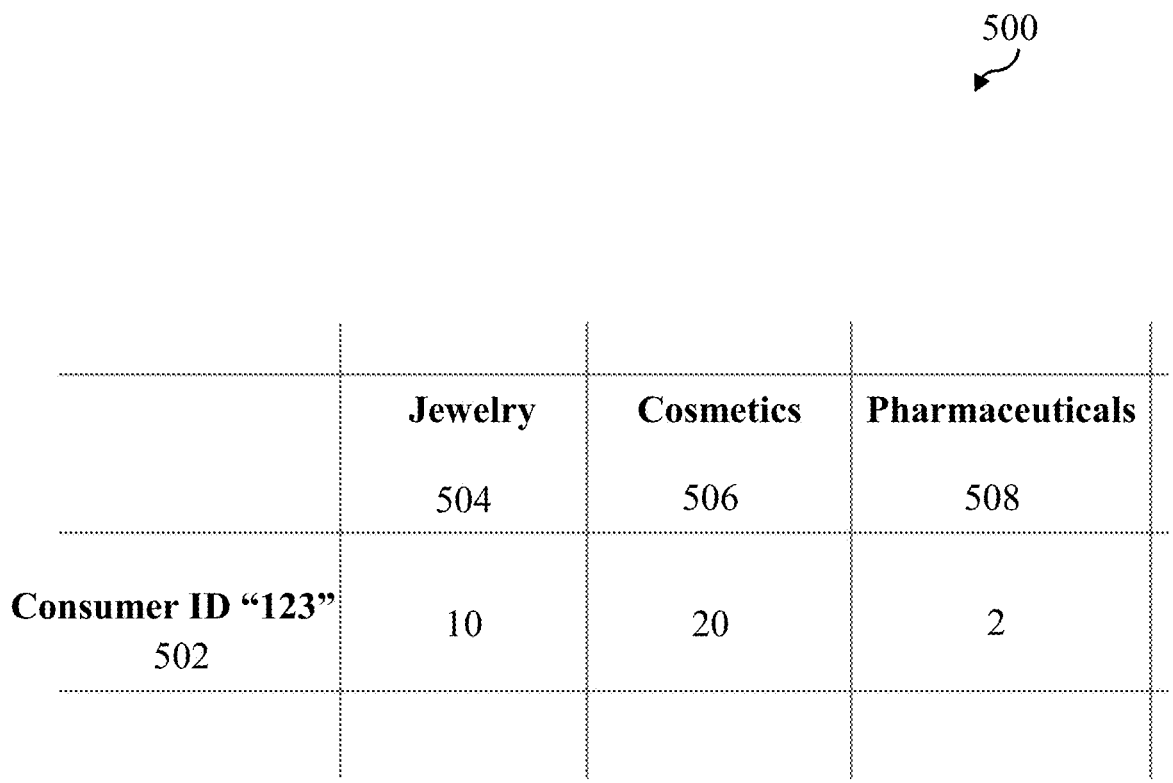
FIG. 5 is a schematic illustration of a portion of a purchase category dataset.

FIG. 5 illustrates a portion of an exemplary two-dimensional matrix data structure 500 for the purchase category dataset 212, in which row 502 corresponds to a consumer with identification number "123" and in which columns 504, 506 and 508 respectively correspond to purchase categories "jewelry," "cosmetics" and "pharmaceuticals."

Figure 6:
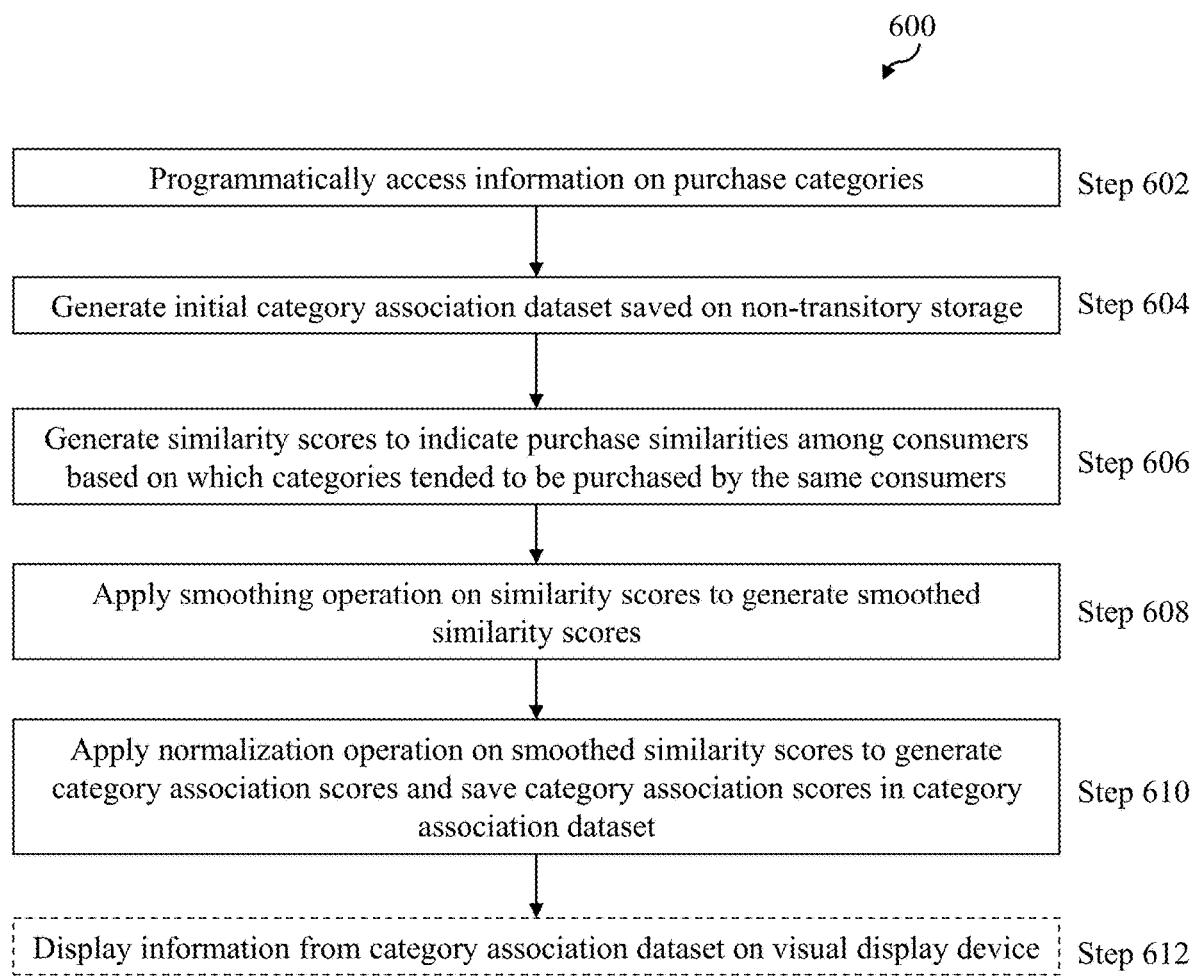
FIG. 6 is a flowchart illustrating an exemplary computer-executable method for programmatically processing a purchase category dataset to generate a category association dataset.

FIG. 6 is a flowchart illustrating an exemplary computer-executed method 600 for using the category association generation engine 214 to programmatically and automatically generate a category association dataset 216 based on information in the purchase category dataset 212.

In step 602, information on the categories in which purchases were made in the prior purchase data may be programmatically accessed, for example, from the purchase category dataset 212 via a network device. In certain non-limiting embodiments, other data may also be accessed including, but not limited to, identifications of the commercial objects purchased, time periods within which the purchases were made, merchants associated with the commercial objects, identifications of the consumers, and the like.

In step 604, an initial category association dataset 216 may be generated for storing pairwise category association scores for each pair of categories in the purchase category dataset 212. A category association score between a first category and a second category may be a numeric likelihood or probability that a consumer making a purchase in the first category will also make a purchase in the second category, or vice versa. The category association dataset 216 may be configured as any suitable data structure, for example, a two-dimensional matrix in which rows and columns correspond to purchase categories. Each purchase category is represented in a single row and a single column, such that the full list of categories is reproduced in both the set of rows and the set of columns. Each entry stores a pairwise category association score between two purchase categories, for example, "jewelry" and "cosmetics." The initial category association dataset 216 may be generated by identifying each purchase category in the purchase category dataset 212 and creating both a row and a column corresponding to that category in the matrix. The category association dataset 216 may be saved on a non-transitory computer-readable storage medium or device.

In step 606, a similarity determination algorithm may be executed on the purchase category dataset 212 to determine purchase similarities among consumers based on which categories tended to be purchased by the same consumers. The similarity determination algorithm may take as input the purchase category dataset 212, and output pairwise similarity scores for each pair of categories and based on data for all consumers in the purchase category dataset 212. The generated pairwise similarity scores may be saved in the category association dataset 216 in one embodiment.

For example, if the purchase category dataset 212 includes two consumers, both of whom purchased ten units in category A, ten units in category B and zero units in category C, then the similarity determination algorithm may determine a high similarity score for the category A-category B pair to indicate that consumers who purchased in category A are also very likely to purchase in category B. The similarity determination algorithm may also determine very low or zero similarity scores for the category A-category C and category B-category C pairs to indicate that consumers who purchased in categories A or B cannot be predicted to also purchase in category C.

The similarity determination algorithm may be configured in one of several suitable ways. In one exemplary embodiment, the similarity determination algorithm may be a cosine similarity algorithm programmed or configured to generate similarity scores that may be saved in the category association dataset 216. In this exemplary embodiment, in the category association dataset 216, each entry $e_{ij}$ corresponds to the i-th row and the j-th column of the matrix and indicates a probability or likelihood that a consumer making purchases in the category of the i-th row will also make purchases in the category of the j-th column. Each similarity score, $SIM\{i,j\}$, corresponding to entry $e_{ij}$ may be computed using a cosine similarity (dot product), as specified in Equation (1) as:

$$SIM\{i, j\} = \frac{(S_i \cdot S_j)}{(\|S_i\| \|S_j\|)}, \qquad (1)$$

where $S_i$ is the category corresponding to the i-th column of the purchase category dataset 212, where $S_j$ is the category corresponding to the j-th column of the purchase category dataset 212, where $(S_i \cdot S_j)$ is the dot product of columns corresponding to the i-th and j-th columns of the purchase category dataset 212, where $\|S_i\|$ is the norm of $S_i$ (e.g., one-norm, two-norm or others), and where $\|S_j\|$ is the norm of $S_j$ (e.g., one-norm, two-norm or others).

In another exemplary embodiment, the similarity determination algorithm may be implemented to generate Jaccard similarity measures. In another exemplary embodiment, the similarity determination algorithm may be a weighted cosine similarity algorithm.

In certain non-limiting embodiments, in step 608, a smoothing operation may be performed on the similarity scores generated in step 606 to generate pairwise smoothed similarity scores. The generated pairwise smoothed similarity scores may be saved in the category association dataset 216 in one embodiment. In one exemplary embodiment, each smoothed similarity score, $SSIM\{i,j\}$, corresponding to entry $e_{ij}$ may be computed using the following exemplary Equation (2):

$$SSIM\{i, j\} = \frac{SIM\{i, j\} \times |S_i \cdot S_j|}{(|S_i \cdot S_j| + \log_2|S_i| + 1)} \times (1 + \log_2|S_j|) + smoothingFact, \qquad (2)$$

where smoothingFact is a constant, for example 8.0.

In certain non-limiting embodiments, in step 610, a normalization operation may be performed on the smoothed similarity scores generated in step 608 to generate pairwise category association scores. The generated pairwise category association scores may be saved in the category association dataset 216 in one embodiment. In one exemplary embodiment, the category association dataset 216 filled with the smoothed similarity scores after step 608 may be converted to a left stochastic matrix by normalizing the columns by dividing each matrix entry by the sum of each column. This normalization operation compensates for the large number of purchases in popular categories (e.g., generic categories such as "Electronics—Other" and "Health and Beauty—Other") as these purchases are not especially useful in predicting category associations with other categories.

In certain non-limiting embodiments, in step 612, information from the category association dataset 216 may be displayed on a visual display device, for example, in response to a request transmitted from an external computing device and received via a network device.

FIG. 7 illustrates an exemplary two-dimensional matrix data structure 700 for the category association dataset 216, in which rows 702, 704 and 706 respectively correspond to purchase categories of "jewelry," "cosmetics" and "pharmaceuticals," and in which columns 708, 710 and 712 respectively correspond to purchase categories of "jewelry," "cosmetics" and "pharmaceuticals."

The category association scores saved in the category association dataset 216 may be used in recommending commercial objects for purchase by a particular consumer based on data on prior purchases made by that particular consumer. For example, if the consumer previously made purchases in a first set of categories, and if the first set of categories is associated with a second set of categories as indicated by category association scores, then it may be determined that commercial objects in the second set of categories are likely to be purchased by the consumer.

Figure 8A:
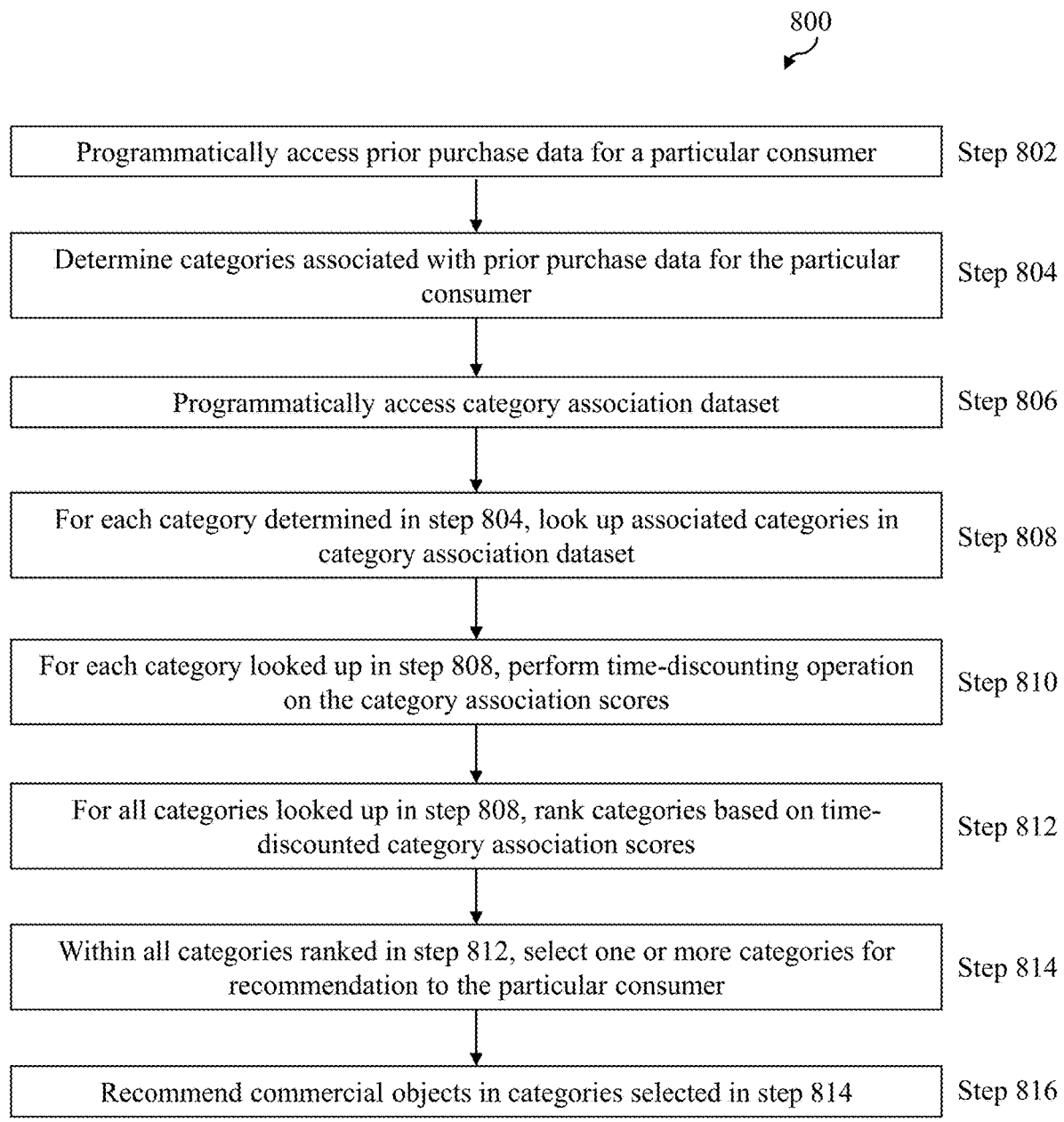
FIG. 8A is a flowchart illustrating an exemplary computer-executable method for programmatically recommending one or more commercial objects for a consumer based on the prior purchase history of the consumer.

FIG. 8A is a flowchart illustrating an exemplary computer-executable method 800 for programmatically recommending one or more commercial objects for a particular consumer based on the prior purchase history of the particular consumer.

In step 802, the particular consumer's prior purchase data may be accessed, for example, from the historical database 110 via a network device. In step 804, categories in which the particular consumer made purchases may be determined from the prior purchase data accessed in step 802. For example, it may be determined that the consumer made a single purchase in the category "Jewelry."

In step 806, the category association dataset 216 may be accessed, for example, from a non-transitory computer-readable storage via a network device. In step 808, for each category determined in step 804, associated categories may be looked up in the category association dataset 216 accessed in step 806. For example, for the prior purchase category of "Jewelry," categories of "Cosmetics" and "Golf" may be looked up in the category association dataset 216. In one exemplary embodiment, for each category determined in step 804, only those categories looked up in step 808 having category association scores above a predetermined threshold may be selected. For example, if it is determined that "Jewelry" is associated with "Cosmetics" by a category association score of 0.8 and that "Jewelry" is associated with "Golf" by a category association score of 0.05, then only the category of "Jewelry" may be selected (for example, because it is higher than a predetermined threshold of 0.5).

In step 810, for each category determined in step 804, time discounting may be performed on the category association scores to account for the time period during which the prior purchase data accessed in step 802 was acquired. The time-discounted category association score may be a purchase probability score indicating the likelihood of purchasing in the category accessed in step 804. As such, the older the prior purchase data, the greater the discounting such that the category association scores are reduced in magnitude, thereby allow "fresher" data to have a greater impact on the recommendation process. In one exemplary embodiment, a time discounting factor may be a double log of the number of days since the purchase made in the prior purchase data accessed in step 802. An equation for the purchase probability score, $PP_i$, is set forth in Equation (3) as:

$$PP_i = \text{SIGMA}_j(w_j \text{SSIM}\{i,j\}), \quad (3)$$

where:

$$w_j = \frac{1}{\log_2(\log_2(1+d_j)+1)+1},$$

and where $d_j$ is the number of days since purchase in category j.

As an example, if the consumer purchased a product or a promotion in category $S_1$ ten days ago and a product or a promotion in category $S_2$ 100 days ago, it may be determined from the category association dataset 216 that a category $S_3$ has a category association score of 0.2 with $S_1$ and a category association score of 0.4 with $S_2$. In this case, the overall purchase probability score, PP, may be computed as:

$$\frac{0.2}{\log_2(\log_2(1+10)+1)+1} + \frac{0.4}{\log_2(\log_2(1+100)+1)+1}.$$

In step 812, for all categories looked up in step 808, the categories may be ranked based on the time-discounted category association scores in descending order.

In step 814, within all categories ranked in step 812, one or more categories may be selected for recommendation to the particular consumer. In one exemplary embodiment, only those categories having time-discounted category association scores above a predetermined threshold may be selected. In another exemplary embodiment, only those categories having ranked at or above a certain ranking position may be selected.

In step 816, one or more commercial objects in the categories selected in step 814 may be selected and recommended to the particular consumer. In one embodiment, one or more computer-executable instructions may be transmitted, via a network device, to a consumer computing device to cause a visual display to render an indication of the commercial objects selected in step 816.

In some embodiments, the commercial objects recommended to the consumer may be ranked based on the category association scores for the categories of the recommended objects with respect to the categories determined in step 804. For example, within products in the categories selected in step 814, a first product in a first category (with a category association score of 0.8 with respect to the category determined in step 804) may be ranked higher than a second product in a second category (with a category association score of 0.4 with respect to the category determined in step 804).

In certain embodiments, a particular consumer's profile data may be used along with the category association scores or overall purchase probabilities to recommend commercial objects to the consumer. The consumer's profile data may indicate that the consumer is interested in a first set of categories. Exemplary embodiments may determine that the first set of categories is related to a second set of categories by category association scores that are above a predetermined threshold. In this case, exemplary embodiments may recommend one or more commercial objects in the second set of categories to the consumer to capitalize on the likelihood that the consumer may purchase commercial objects in the second set of categories.

Figure 8B:
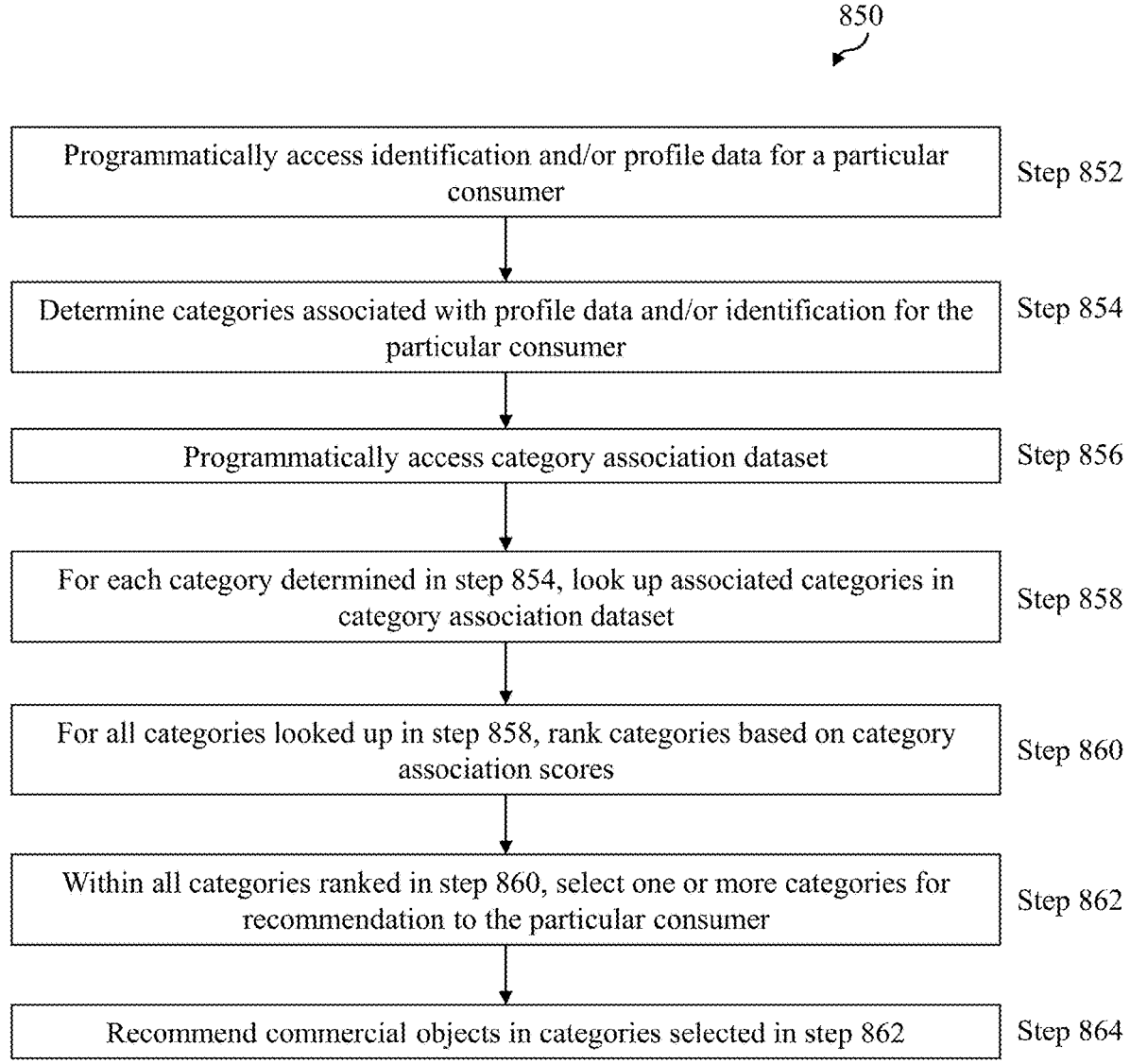
FIG. 8B is a flowchart illustrating an exemplary computer-executable method for programmatically recommending one or more commercial objects for a consumer based on the profile data and/or identification of the consumer.

FIG. 8B is a flowchart illustrating an exemplary computer-executable method 850 for programmatically recommending one or more commercial objects for a particular consumer based on one or more profile data items and/or identification of the particular consumer.

In step 852, the particular consumer's profile data and/or the consumer's identification may be accessed, for example, from the historical database 110 via a network device. In step 854, categories associated with the profile data and/or associated with the consumer's identification may be determined or directly accessed from the data accessed in step 852. As one example, if the consumer's profile data indicates that he is a runner, it may be determined that the consumer is interested in the category "Running Shoes." As another example, an identification of the consumer may be used to determine profile data items of the consumer or categories of interest to the consumer. The identification of the consumer may be based on or retrieved from an email address of the consumer, for example, in an email received from the consumer or in an email to be transmitted to the consumer.

In step 856, the category association dataset 216 may be accessed, for example, from a non-transitory computer-readable storage via a network device. In step 858, for each category determined in step 854, associated categories may be looked up in the category association dataset 216 accessed in step 856. For example, for the category "Running Shoes," categories of "Heart Rate Monitor" and "Water Bottle" may be looked up in the category association dataset 216. In one exemplary embodiment, for each category determined in step 854, only those categories looked up in step 858 having category association scores above a predetermined threshold may be selected. For example, if it is determined that "Running Shoes" is associated with "Heart Rate Monitor" by a category association score of 0.8 and that "Running Shoes" is associated with "Fast Food" by a category association score of 0.05, then only the category of "Heart Rate Monitor" may be selected (for example, because it is higher than a predetermined threshold of 0.5).

In step 860, for all categories looked up in step 858, the categories may be ranked based on the category association scores in descending order.

In step 862, within all categories ranked in step 860, one or more categories may be selected for recommendation to the particular consumer. In one exemplary embodiment, only those categories having category association scores above a predetermined threshold may be selected. In another exemplary embodiment, only those categories having ranked at or above a certain ranking position may be selected.

In step 864, one or more commercial objects in the categories selected in step 862 may be selected and recommended to the particular consumer. In one embodiment, one or more computer-executable instructions may be transmitted, via a network device, to a consumer computing device to cause a visual display to render an indication of the commercial objects selected in step 864.

In some embodiments, the commercial objects recommended to the consumer may be ranked based on the category association scores for the categories of the recommended objects with respect to the categories determined in step 854. For example, within products in the categories selected in step 854, a first product in a first category (with a category association score of 0.8 with respect to the category determined in step 854) may be ranked higher than a second product in a second category (with a category association score of 0.4 with respect to the category determined in step 854).

In certain embodiments, a particular consumer's profile data and prior purchase data may be used along with the category association scores or overall purchase probabilities to recommend commercial objects to the consumer. The consumer's profile data may indicate that the consumer is interested in a first set of categories. The consumer's prior purchase data may indicate that the consumer is interested in a second set of categories. The first and second sets may be overlapping or disjoint. Exemplary embodiments may determine that the first and second sets of categories are related to a third set of categories by category association scores that are above a predetermined threshold. In this case, exemplary embodiments may recommend one or more commercial objects in the third set of categories to the consumer to capitalize on the likelihood that the consumer may purchase commercial objects in the third set of categories.

Figure 9:
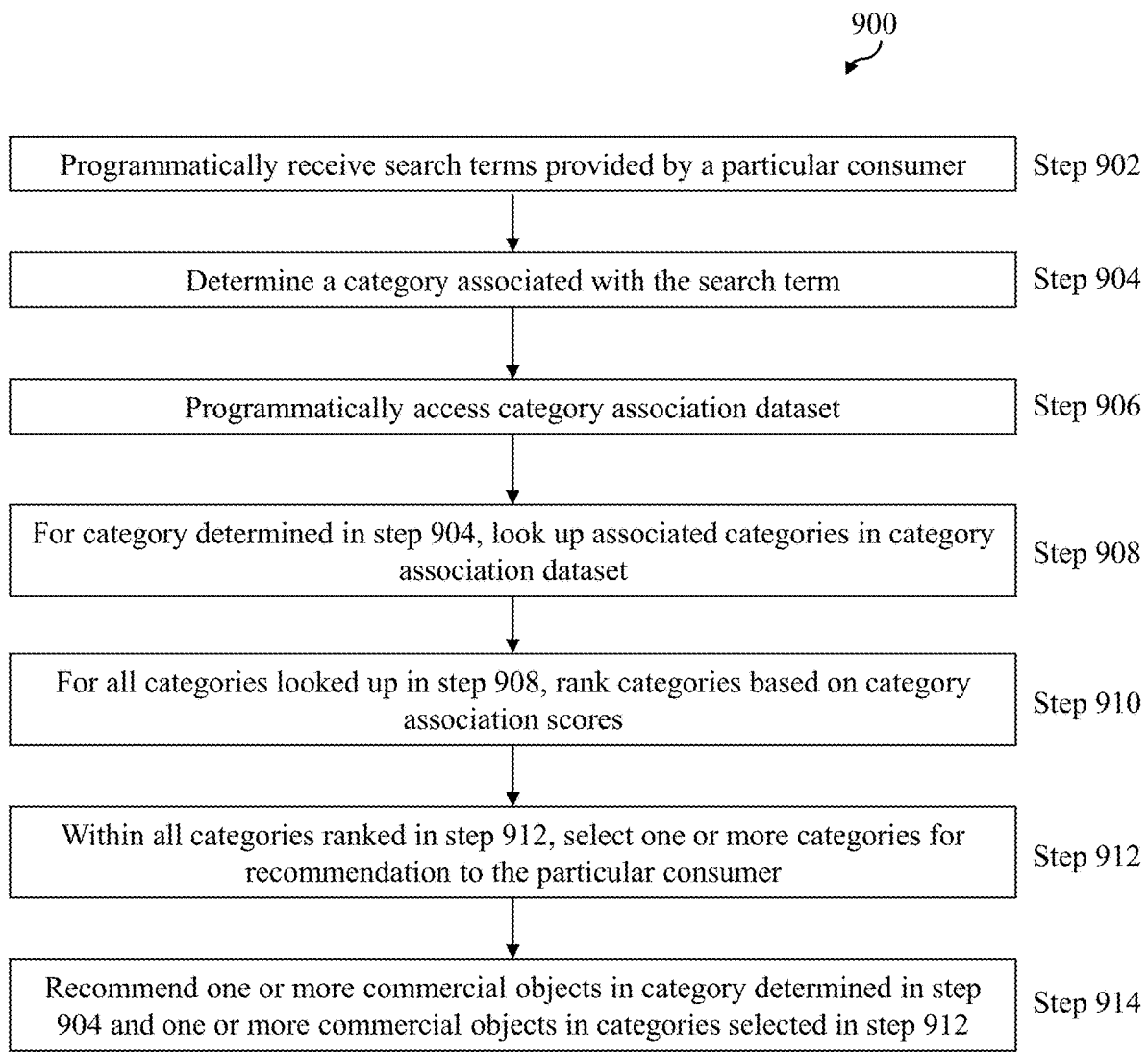
FIG. 9 is a flowchart illustrating an exemplary computer-executable method for programmatically recommending one or more commercial objects for a consumer based on one or more search terms entered by the consumer.

FIG. 9 is a flowchart illustrating an exemplary computer-executable method 900 for programmatically recommending one or more commercial objects for a particular consumer based on one or more search terms entered by the particular consumer. The particular consumer's prior purchase data may not be used in the method of FIG. 9.

In step 902, one or more search terms may be received from the particular consumer, for example, via a network device. In step 904, a category associated with the search terms may be determined. For example, if the search term indicates "wedding ring," it may be determined that the consumer wishes to search in the category of "Jewelry—Diamond Ring."

In step 906, the category association dataset 216 may be accessed, for example, from a non-transitory computer-readable storage via a network device. In step 908, for the category determined in step 904, associated categories may be looked up in the category association dataset 216 accessed in step 906. For example, for the category of "Jewelry—Diamond Ring," categories of "Jewelry—Diamond Necklace" and "Golf" may be looked up in the category association dataset 216. In one exemplary embodiment, for the category determined in step 904, only those categories looked up in step 904 having category association scores above a predetermined threshold may be selected. For example, if it is determined that "Jewelry—Diamond Ring" is associated with "Jewelry—Diamond Necklace" by a category association score of 0.8 and that "Jewelry—Diamond Ring" is associated with "Golf" by a category association score of 0.05, then only the category of "Jewelry—Diamond Necklace" may be selected (for example, because it is higher than a predetermined threshold of 0.5).

In step 910, for all categories looked up in step 908, the categories may be ranked based on the category association scores in descending order.

In step 912, within all categories ranked in step 910, one or more categories may be selected for recommendation to the particular consumer. In one exemplary embodiment, only those categories having category association scores above a predetermined threshold may be selected. In another exemplary embodiment, only those categories having ranked at or above a certain ranking position may be selected.

In step 914, one or more commercial objects in the categories selected in step 912 may be selected and recommended to the particular consumer in addition to one or more commercial objects in the category determined in step 904. In one embodiment, one or more computer-executable instructions may be transmitted, via a network device, to a consumer computing device to cause a visual display to render an indication of the commercial objects selected in step 914.

In some embodiments, the commercial objects recommended to the consumer may be ranked based on the category association scores for the categories of the recommended objects with respect to the category received in step 904. For example, a product in the category received in step 904 may be ranked above products in the categories selected in step 912. Within products in the categories selected in step 912, a first product in a first category (with a category association score of 0.8 with respect to the category received in step 904) may be ranked higher than a second product in a second category (with a category association score of 0.4 with respect to the category received in step 904).

Figure 10:
FIG. 10 illustrates an exemplary user interface displaying recommendations for a consumer generated based on search terms entered by the consumer.

FIG. 10 illustrates an exemplary user interface 1000 displaying recommendations for a consumer generated based on search terms "wedding ring" entered in an input field 1002. Exemplary embodiments may determine a category of "Jewelry—Diamond Ring" corresponding to the search terms. In response to the search terms, exemplary embodiments may display a first product (a diamond ring) 1004 falling in the category entered by the consumer. In addition, a second category ("Jewelry—Diamond Necklace") may be determined based on a high category association score between the two categories "Jewelry—Diamond Ring" and "Jewelry—Diamond Necklace." A second product (a diamond necklace) 1006 falling in the second category may be displayed as well, but ranked below the second product.

III. Exemplary Computing Devices

Systems and methods disclosed herein may include one or more programmable processing units having associated therewith executable instructions held on one or more computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback means may also be included, for example, for rendering a graphical user interface, according to the present disclosure. The display and/or other feedback means may be stand-alone equipment or may be included as one or more components/modules of the processing unit(s).

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 11:
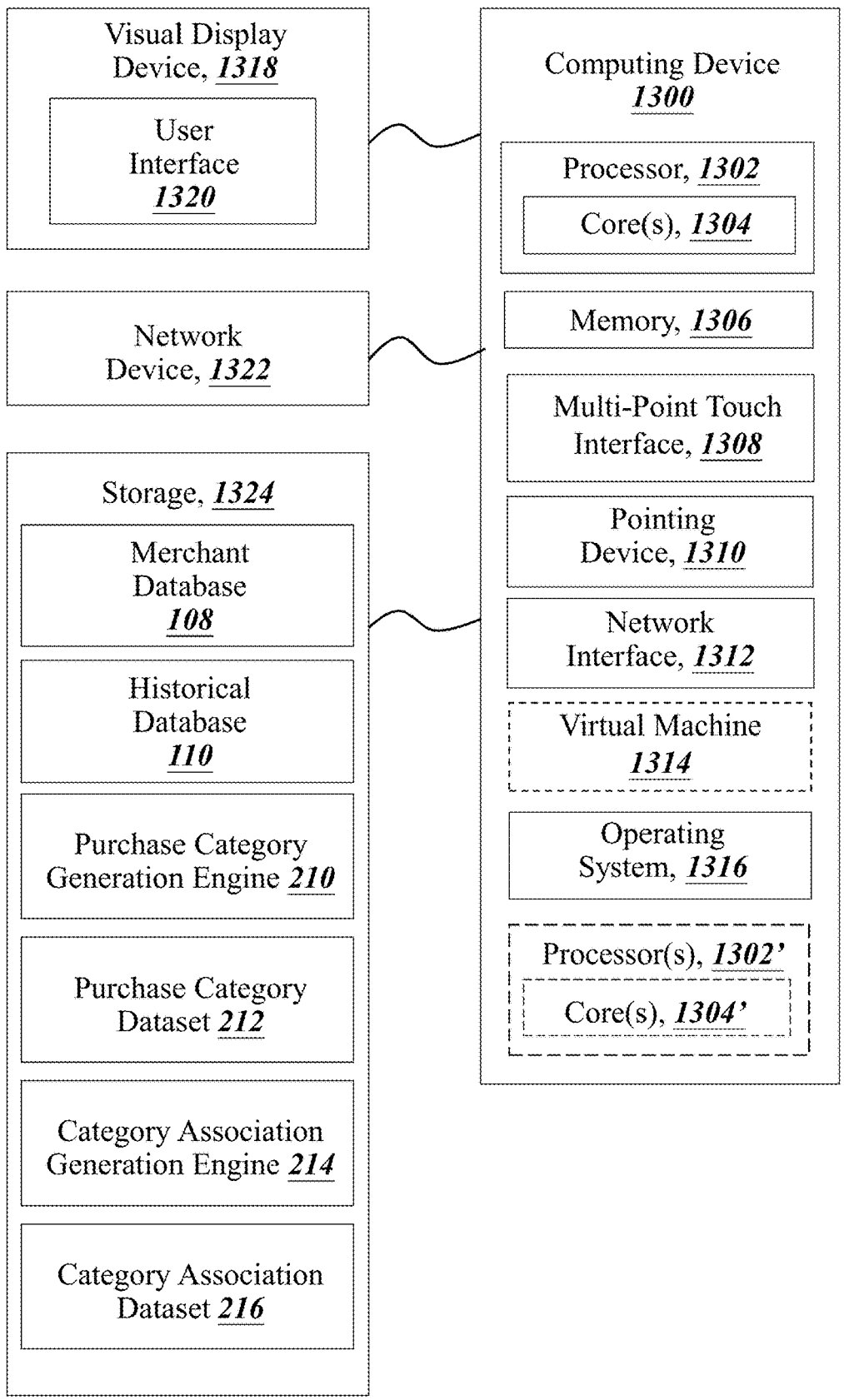
FIG. 11 is a block diagram of an exemplary computing device that may be used to implement and execute exemplary computer-executable methods.

FIG. 11 depicts a block diagram representing an exemplary computing device 1300 that may be used to implement the systems and methods disclosed herein. The computing device 1300 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may include a plurality of such computing devices.

The computing device 1300 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1306 included in the computing device 1300 may store computer-readable and computer-executable instructions or software for implementing a graphical user interface as described herein. The computing device 1300 also includes processor 1302 and associated core 1304, and in some embodiments, one or more additional processor(s) 1302' and associated core(s) 1304' (for example, in the case of computer systems having multiple processors/cores), for executing computer-readable and computer-executable instructions or software stored in the memory 1302 and other programs for controlling system hardware. Processor 1302 and processor(s) 1302' may each be a single core processor or a multiple core (1304 and 1304') processor.

Virtualization may be employed in the computing device 1300 so that infrastructure and resources in the computing device may be shared dynamically. A virtual machine 1314 may be provided to handle a process running on multiple processors so that the process appears to be using only one computing resource rather than multiple computing resources. Multiple virtual machines may also be used with one processor.

Memory 1306 may include a computer system memory or random access memory, such as DRAM, SRAM, EDO RAM, and the like. Memory 1306 may include other types of memory as well, or combinations thereof.

A user may interact with the computing device 1300 through a visual display device 1318, such as a screen or monitor, which may display one or more graphical user interfaces 1320 provided in accordance with exemplary embodiments described herein. The visual display device 1318 may also display other aspects, elements and/or information or data associated with exemplary embodiments.

The computing device 1300 may include other I/O devices for receiving input from a user, for example, a keyboard or any suitable multi-point touch interface 1308 or pointing device 1310 (e.g., a mouse, a user's finger interfacing directly with a display device). As used herein, a "pointing device" is any suitable input interface, specifically, a human interface device, that allows a user to input spatial data to a computing system or device. In an exemplary embodiment, the pointing device may allow a user to provide input to the computer using physical gestures, for example, pointing, clicking, dragging, dropping, and the like. Exemplary pointing devices may include, but are not limited to, a mouse, a touchpad, a finger of the user interfacing directly with a display device, and the like.

The keyboard 1308 and the pointing device 1310 may be coupled to the visual display device 1318. The computing device 1300 may include other suitable conventional I/O peripherals. The I/O devices may facilitate implementation of the one or more graphical user interfaces 1320, for example, implement one or more of the graphical user interfaces described herein.

The computing device 1300 may include one or more storage devices 1324, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1324 may provide storage for data that may be generated by the systems and methods of the present disclosure. For example, a storage device 1324 may provide storage for a merchant database 108 including information on one or more merchants, and for a historical database 110 including information on one or more prior activities performed by consumers and profile information on consumers. A non-transitory storage device 1324 may also provide non-transitory storage for computer-executable instructions that, when executed using a processor 1302 of the computing device 1300, perform one or more operations of the purchase category generation engine 210 and the category association generation engine 214. The non-transitory storage device 1324 may also provide non-transitory storage for the purchase category dataset 212 and the category association dataset 216. The one or more storage devices 1324 may be provided on the computing device 1300 and/or provided separately or remotely from the computing device 1300. The exemplary components depicted as being stored on storage device 1324 may be stored on the same or on different storage devices.

The computing device 1300 may include a network interface 1312 configured to interface via one or more network devices 1322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1312 may include a built-in network adapter, network interface card, PCMCIA network card, card bus network adapter, wireless network adapter, USB network adapter, modem or any other device suitable for interfacing the computing device 1300 to any type of network capable of communication and performing the operations described herein. The network device 1322 may include one or more suitable devices for receiving and transmitting communications over the network including, but not limited to, one or more receivers, one or more transmitters, one or more transceivers, one or more antennae, and the like.

The computing device 1300 may run any operating system 1316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1316 may be run in native mode or emulated mode. In an exemplary embodiment, the operating system 1316 may be run on one or more cloud machine instances.

One of ordinary skill in the art will recognize that exemplary computing device 1300 may include more or fewer modules than those shown in FIG. 11.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications, combinations and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications, combinations and other embodiments are intended to be included within the scope of the appended claims. Although specific terms are employed herein, they are used in a generic and descriptive sense only and not for purposes of limitation.

What is claimed is:

1. An apparatus comprising a processor and at least one memory including computer program code, the at least one memory and the computer program code configured to, with the processor, cause the apparatus to at least:

access purchase data associated with purchases of a plurality of objects made using a plurality of consumer profiles, the plurality of objects associated with a plurality of categories;

generate a category association score between at least one pair of categories in the plurality of categories, wherein generating the category association score comprises:

applying a similarity determination algorithm to the at least one pair of categories to produce a similarity score for the at least one pair of categories, wherein the similarity score for the at least one pair of categories indicates a predicted likelihood of correlation between purchasing behavior associated with a first category in the at least one pair and a second category in the at least one pair of categories, and wherein the predicted likelihood of correlation is determined based on purchase data associated with the plurality of consumer profiles, performing a smoothing operation on the similarity score to produce a smoothed similarity score for the at least one pair of categories, and performing a time discounting adjustment operation on the category association score based on a temporal proximity between a purchase data time associated with the purchase data and an analysis time associated with generating the category association score between the at least one pair of categories;

receive search terms entered to an input field of a consumer computing device display interface displayed by a consumer computing device associated with a consumer profile;

determine a first object of the first category of the at least one pair of categories based on the search terms by applying a double log operation to the purchase data time;

compare the category association score associated with the at least one pair of categories to a category association threshold and, in circumstances in which the category association score satisfies the category association threshold, select a second object of the second category of the at least one pair of categories; and transmit, to the consumer computing device, one or more computer-executable instructions causing the consumer computing device to visually display impressions associated with the first object and the second object in the same field of view proximate the input field of the consumer computing device display interface.

2. The apparatus of claim 1, wherein generating the category association score further comprises:

performing a normalization operation on the smoothed similarity score to generate a normalized category association score, and wherein the time discounting adjustment operation is performed on the normalized category association score.

3. The apparatus of claim 1, wherein the first object is an object previously purchased using the consumer profile.

4. The apparatus of claim 1, wherein the first object of the first category is determined based on using the search terms to query a merchant database.

5. A computer-executed method comprising:

accessing purchase data associated with purchases of a plurality of objects made using a plurality of consumer profiles, the plurality of objects associated with a plurality of categories;

generating a category association score between at least one pair of categories in the plurality of categories, wherein generating the category association score comprises:

applying a similarity determination algorithm to the at least one pair of categories to produce a similarity score for the at least one pair of categories, wherein the similarity score for the at least one pair of categories indicates a predicted likelihood of correlation between purchasing behavior associated with a first category in the at least one pair and a second category in the at least one pair of categories, and wherein the predicted likelihood of correlation is determined based on purchase data associated with the plurality of consumer profiles, performing a smoothing operation on the similarity score to produce a smoothed similarity score for the at least one pair of categories, and performing a time discounting adjustment operation on the category association score based on a temporal proximity between a purchase data time associated with the purchase data and an analysis time associated with generating the category association score between the at least one pair of categories;

receiving search terms entered to an input field of a consumer computing device display interface displayed by a consumer computing device associated with a consumer profile;

determining a first object of the first category of the at least one pair of categories based on the search terms by applying a double log operation to the purchase data time;

comparing the category association score associated with the at least one pair of categories to a category association threshold and, in circumstances in which the category association score satisfies the category association threshold, selecting a second object of the second category of the at least one pair of categories; and transmitting, to the consumer computing device, one or more computer-executable instructions causing the consumer computing device to visually display impressions associated with the first object and the second object in the same field of view proximate the input field of the consumer computing device display interface.

6. The computer-executed method of claim 5, wherein generating the category association score further comprises:

performing a normalization operation on the smoothed similarity score to generate a normalized category association score, wherein the time discounting adjustment operation is performed on the normalized category association score.

7. The computer-executed method of claim 5, wherein the first object of the first category is determined based on using the search terms to query a merchant database.

8. The computer-executed method of claim 5, wherein the category association score is stored to a matrix dataset associated with the at least one pair of categories.

9. The computer-executed method of claim 5, wherein the first object and the second object may be further determined based on consumer profile data drawn from the consumer profile.

10. The apparatus of claim 1, wherein the category association score is stored to a matrix dataset associated with the at least one pair of categories.

11. The apparatus of claim 1, wherein the first object and the second object may be further determined based on consumer profile data drawn from the consumer profile.

12. One or more non-transitory computer-readable media having encoded thereon one or more computer-executable instructions that, when executed on a computer, cause the computer to:
   access purchase data associated with purchases of a plurality of objects made using a plurality of consumer profiles, the plurality of objects associated with a plurality of categories;
   generate a category association score between at least one pair of categories in the plurality of categories, wherein generating the category association score comprises:
      applying a similarity determination algorithm to the at least one pair of categories to produce a similarity score for the at least one pair of categories, wherein the similarity score for the at least one pair of categories indicates a predicted likelihood of correlation between purchasing behavior associated with a first category in the at least one pair and a second category in the at least one pair of categories, and wherein the predicted likelihood of correlation is determined based on purchase data associated with the plurality of consumer profiles,
      performing a smoothing operation on the similarity score to produce a smoothed similarity score for the at least one pair of categories, and
      performing a time discounting adjustment operation on the category association score based on a temporal proximity between a purchase data time associated with the purchase data and an analysis time associated with generating the category association score between the at least one pair of categories;
   receive search terms entered to an input field of a consumer computing device display interface displayed by a consumer computing device associated with a consumer profile;
   determine a first object of the first category of the at least one pair of categories based on the search terms by applying a double log operation to the purchase data time;
   compare the category association score associated with the at least one pair of categories to a category association threshold and, in circumstances in which the category association score satisfies the category association threshold, select a second object of the second category of the at least one pair of categories; and
   transmit, to the consumer computing device, one or more computer-executable instructions causing the consumer computing device to visually display impressions associated with the first object and the second object in the same field of view proximate the input field of the consumer computing device display interface.

13. The one or more non-transitory computer-readable media of claim 12, wherein generating the category association score further comprises:
   performing a normalization operation on the smoothed similarity score to generate a normalized category association score,
   wherein the time discounting adjustment operation is performed on the normalized category association score.

14. The one or more non-transitory computer-readable media of claim 12, wherein the first object is an object previously purchased using the first consumer profile.

15. The one or more non-transitory computer-readable media of claim 12, wherein the first object of the first category is determined based on using the search terms to query a merchant database.

16. The one or more non-transitory computer-readable media of claim 12, wherein the category association score is stored to a matrix dataset associated with the at least one pair of categories.

17. The one or more non-transitory computer-readable media of claim 12, wherein the first object and the second object may be further determined based on consumer profile data drawn from the consumer profile.

* * * * *